US009367518B2

(12) United States Patent
Swarts et al.

(10) Patent No.: US 9,367,518 B2
(45) Date of Patent: Jun. 14, 2016

(54) METHOD AND SYSTEM FOR EFFICIENT FULL RESOLUTION CORRELATION

(71) Applicant: Broadcom Corporation, Irvine, CA (US)

(72) Inventors: Francis Swarts, San Diego, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 167 days.

(21) Appl. No.: 14/066,785

(22) Filed: Oct. 30, 2013

(65) Prior Publication Data

US 2014/0059102 A1    Feb. 27, 2014

Related U.S. Application Data

(63) Continuation of application No. 11/965,300, filed on Dec. 27, 2007, now Pat. No. 8,583,716.

(60) Provisional application No. 60/944,829, filed on Jun. 19, 2007.

(51) Int. Cl.
*G06F 17/10*     (2006.01)
*G06F 17/15*     (2006.01)
*H04B 1/7156*    (2011.01)

(52) U.S. Cl.
CPC ...... *G06F 17/15* (2013.01); *H04B 2001/71563* (2013.01)

(58) Field of Classification Search
CPC .................................................... G06F 17/15
USPC ................................................. 708/300–323
See application file for complete search history.

(56) References Cited

U.S. PATENT DOCUMENTS

| 4,020,333 | A | 4/1977 | Nussbaumer |
| 6,654,432 | B1 * | 11/2003 | O'Shea et al. ................ 375/354 |
| 7,039,091 | B1 * | 5/2006 | Mauer ........................... 375/140 |
| 7,386,581 | B2 | 6/2008 | Zirkle |
| 7,395,291 | B2 | 7/2008 | Yip et al. |
| 8,583,716 | B2 | 11/2013 | Swarts et al. |
| 2004/0264510 | A1 * | 12/2004 | Labs et al. .................... 370/503 |
| 2008/0320070 | A1 | 12/2008 | Swarts et al. |

* cited by examiner

*Primary Examiner* — Tan V. Mai
(74) *Attorney, Agent, or Firm* — Sterne, Kessler, Goldstein & Fox, PLLC

(57) ABSTRACT

Aspects of a method and system for efficient full resolution correlation may include correlating a first signal with a second signal at a rate corresponding to a first discrete signal, wherein each sample of the first signal may be generated by summing a plurality of consecutive samples from the first discrete signal, and the second signal may be generated by summing the plurality of consecutive samples from a second discrete signal. The correlating may be performed by a matched filter and/or a correlator. The first signal comprising N samples may be generated by summing L consecutive samples for each of the N samples from the first discrete signal comprising N*L samples. The second signal comprising N samples may be generated by summing L consecutive samples for each of the N samples from the second discrete signal comprising N*L samples. The first signal and the second signal may be correlated by multiplying the N samples of the first signal with the N samples of the second signal in N multipliers and summing a plurality of outputs of the multipliers. A maximum of the correlating may be determined to achieve synchronization between the first discrete signal and the second discrete signal.

20 Claims, 3 Drawing Sheets

METHOD AND SYSTEM FOR EFFICIENT FULL RESOLUTION CORRELATION

CROSS-REFERENCE TO RELATED APPLICATIONS/INCORPORATION BY REFERENCE

This application is a continuation of copending U.S. patent application Ser. No. 11/965,300, filed on Dec. 27, 2007, which claims priority to U.S. Provisional Application No. 60/944,829, filed on Jun. 19, 2007, both of which are hereby incorporated herein by reference in their entirety.

FIELD OF THE INVENTION

Certain embodiments of the invention relate to signal processing. More specifically, certain embodiments of the invention relate to a method and system for efficient full resolution correlation.

BACKGROUND OF THE INVENTION

Electronic communication has become prolific over the last decade. While electronic communication was initially limited to the desktop, recent trends have been to make communications, media content and the Internet available anytime, anywhere and, increasingly, on any device. Already now, it is quite common to find mobile devices such as cellular phones or Personal Digital Assistants (PDAs) that incorporate a large range of communication technologies and associated software. For example, fully-featured web-browsers, email clients, MP3 players, instant messenger software, and Voice-over-IP may all be found on some recent devices.

To support many different communication standards and data formats, it is desirable to use efficient signal processing, which may prolong battery life in portable devices, and reduce computational complexity.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for efficient full resolution correlation, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for efficient full resolution correlation. Aspects of the invention may comprise correlating a first signal with a second signal at a rate corresponding to a first discrete signal, wherein each sample of the first signal may be generated by summing a plurality of consecutive samples from the first discrete signal, and the second signal may be generated by summing the plurality of consecutive samples from a second discrete signal. The correlating may be performed by a matched filter and/or a correlator. The first signal comprising N samples may be generated by summing L consecutive samples for each of the N samples from the first discrete signal comprising N*L samples. The second signal comprising N samples may be generated by summing L consecutive samples for each of the N samples from the second discrete signal comprising N*L samples. The first signal and the second signal may be correlated by multiplying the N samples of the first signal with the N samples of the second signal in N multipliers and summing a plurality of outputs of the multipliers. A maximum of the correlating may be determined to achieve synchronization between the first discrete signal and the second discrete signal.

Figure 1:
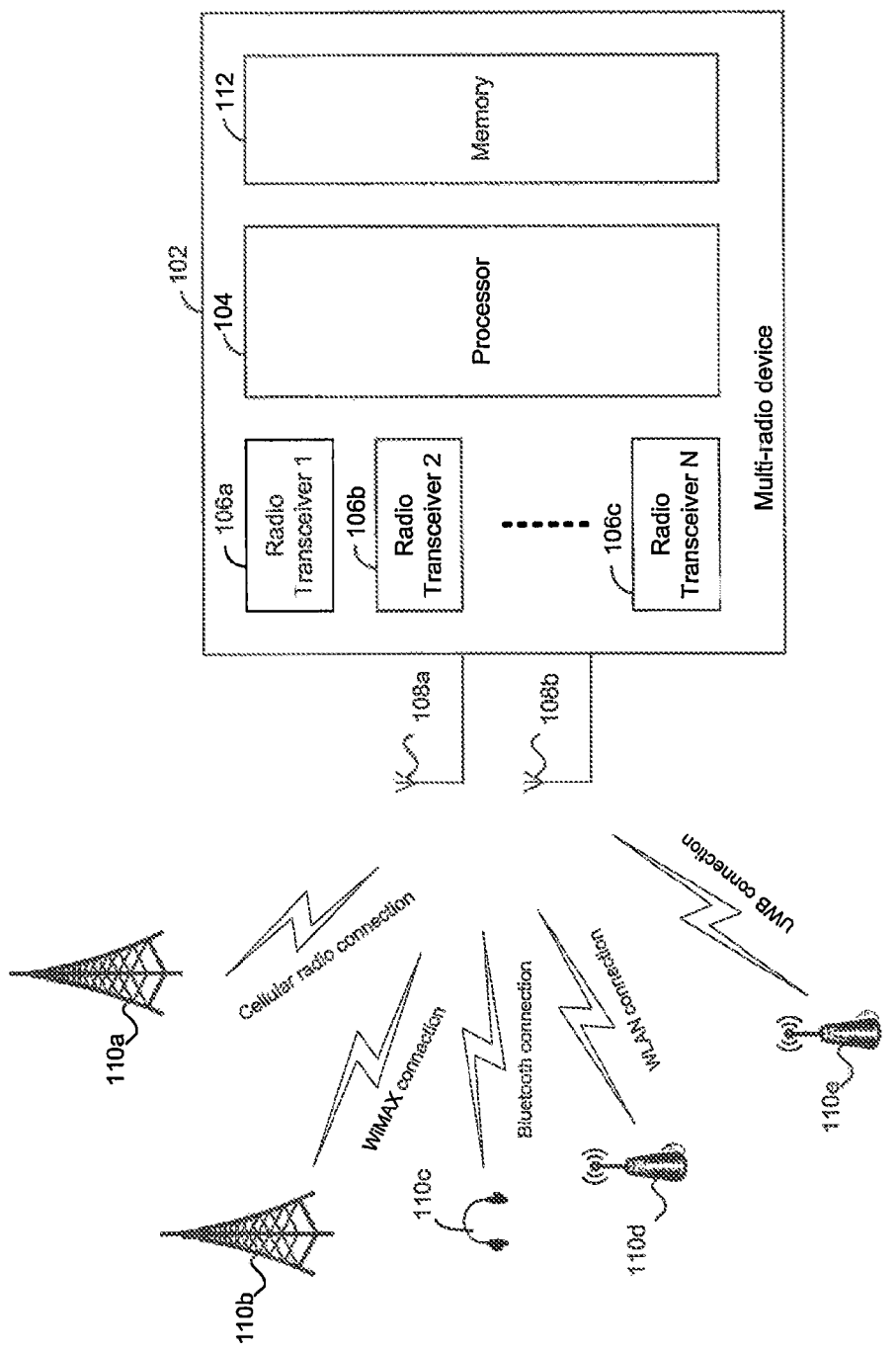
FIG. 1 is a block diagram illustrating an exemplary multi-radio system in accordance with an embodiment of the invention.

FIG. 1 is a block diagram illustrating an exemplary multi-radio system in accordance with an embodiment of the invention. Referring to FIG. 1, there is shown a multi-radio device 102, comprising a processor 104, memory 112, and a plurality of radio transceivers, of which radio transceiver 106a, radio transceiver 106b, and radio receiver 106c may be illustrated. The multi-radio device 102 may be communicatively coupled to one or more antennas, of which antennas 108a and 108b may be illustrated. There is also shown a cellular base station 110a, a WiMAX base station 110l), headphones 110c, a Wireless Local Area Network (WEAN) access point 110d, and an Ultra-Wideband (UWB) access point 110e.

The multi-radio device 102 may be enabled to generate and/or receive radio-frequency (RF) signals in accordance with one or more RF technologies. The multi-radio device 102 may be enabled to perform, for example, baseband signal processing in the processor 104. The processor 104 may comprise suitable logic, circuitry and/or code that may be enabled to perform a variety of signal processing tasks and may include controlling of the radio transceivers 106a through 106c, for example. The memory 112 may comprise suitable logic, circuitry and/or code that may be enabled to store data and/or code that may be accessed by the processor 104 and/or the radio transceivers 106a through 106c (1-N). The radio transceiver 106a may comprise suitable logic, circuitry and/or code that may be enabled to generate RF signals and intermediate frequency (IF) signals from baseband signals, which may be communicated from the processor 104, in accordance with a radio frequency technology and/or standard. In addition, the radio transceiver 106a may comprise suitable logic, circuitry and/or code that may be enabled to receive RF signals via one or more antennas, for example, antennas 108a and 108b, and convert the RF signals to baseband signals. The generated baseband signals may be desirably formatted for further processing in the processor 104, for example.

The radio transceivers 1061 through 106c (2-N) may be substantially similar to radio transceiver 106a but may operate in accordance with different radio technologies. The radio transceivers 106a through 106c (1-N) may, for example, generate and/or receive signals in accordance with cellular radio standards (UMTS, GSM, EDGE, HSDP, EV-DO, CDMA 2000 and others), broadband standards (for example WiMAX IEEE 802.16, WiBro), and short-range communication standards (WLAN IEEE 802.11, UWB, ZigBee and others). In some instances, the radio transceivers 106a though 106c may be enabled to conform with multiple radio frequency technologies, for example when a radio transceiver may be a software-defined radio platform. The plurality of antennas communicatively coupled to the multi-radio device 102, for example antennas 108a and 108b, may be communicatively coupled to one or more radio transceivers 106a through 106c. Each radio transceiver may be communicatively coupled to at least one antenna, and some antennas may be shared between a plurality of the radio transceivers 106a, ..., 106c. Each of the radio transceiver 106a through 106c may receive and/or transmit RF signals in accordance with an RF technology to/from another device, for example, a cellular basestation 110a, a WiMAX basestation 110b, a Bluetooth headphone 110c, a WLAN access point 110d, and/or a UWB access point 110e. In accordance with various embodiments of the invention, the components of the multi-radio device 102 may be implemented in a single chip, or with multiple chips and associated circuitry.

In many instances, downconverted baseband signals from the radio transceivers 106a through 106c may initially be unsynchronized but may need to be synchronized and/or identified. In accordance with various embodiments of the invention, synchronization may be achieved by correlating a received signal with a local signal, for example a synchronization signal.

Figure 2:
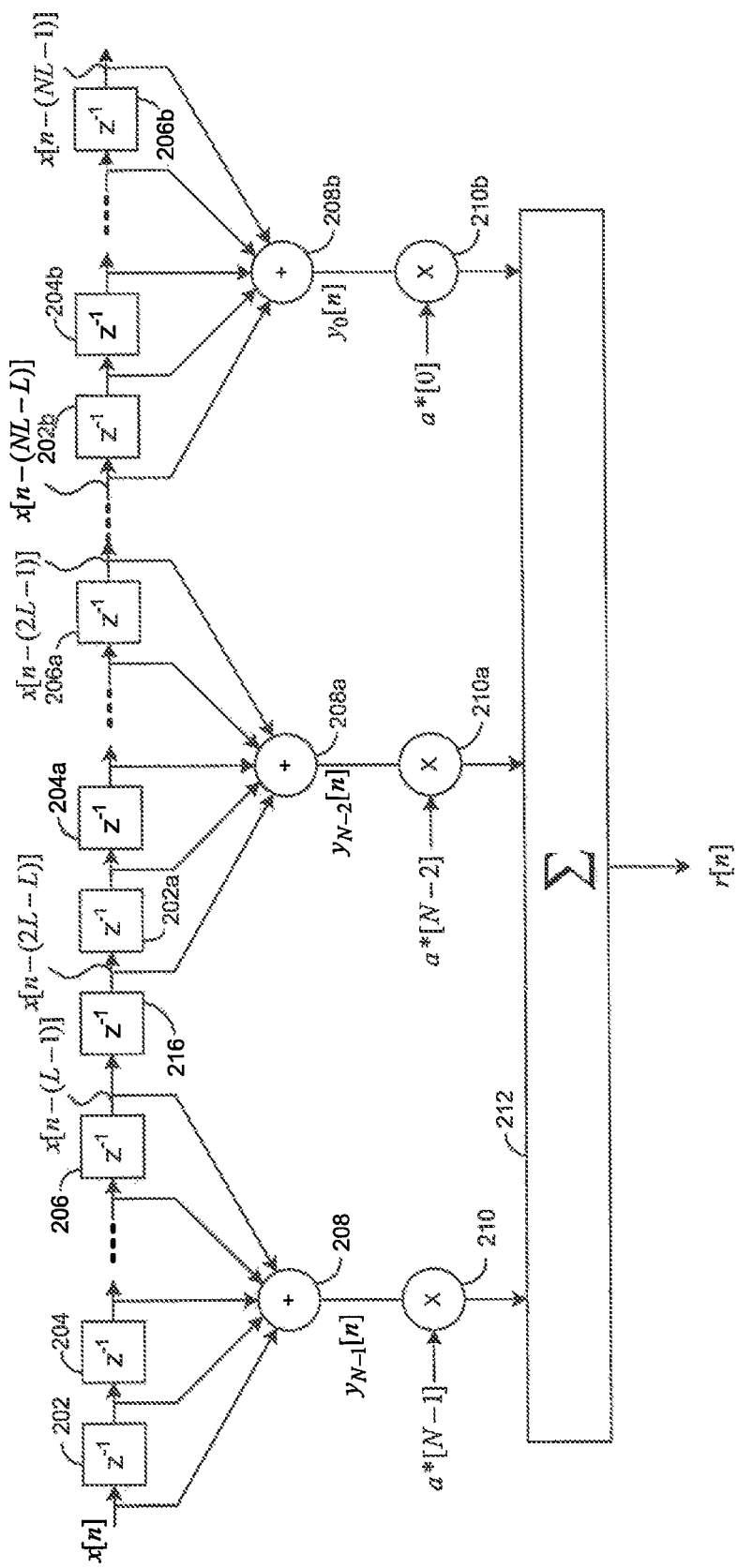
FIG. 2 is a block diagram of an efficient full resolution correlator, in accordance with an embodiment of the invention.

FIG. 2 is a block diagram of an efficient full resolution correlator, in accordance with an embodiment of the invention. Referring to FIG. 2, there is shown a plurality of delay blocks, of which delay blocks 202, 204, 206, 216, 202a, 204a, 206a, 202b, 204b, and 206b may be illustrated. There are also shown adders 208, 208a, 208b and 212, and multipliers 210, 210a and 210b. There is also shown input samples x[n], delayed input samples x[n−(N−1)], x[n−(2L−1)] and x[n−(NL−1)], complex conjugate reference samples a*[0], a*[N−2] and a*[N−1], and a correlation output signal r[n]. The symbol .* may denote the complex conjugate operation.

The delay blocks 202, 204, 206, 216, 202a, 204a, 206a, 202b, 204b, and 206b may be substantially similar. The delay block 202, for example, may comprise suitable logic, circuitry and/or code that may be enabled to delay an input sample by one clock period. The adders 208, 208a, 208b and 212 may be substantially similar and may be able to generate an output signal that may be proportional to the sum of the input signals. The multipliers 210, 210a and 210b may be substantially similar and may comprise suitable logic, circuitry and/or code that may be enabled to generate an output signal that may be proportional to the product of the input signals.

In many communication systems, timing synchronization may be important. For example, synchronization may be required between the received signal and a local signal at a receiver, for example a synchronization signal. In some instances, such systems may employ dedicated synchronization sequences for timing synchronization. In order for synchronization to be achieved, received input samples, for example input samples x[n], may be matched to a synchronization sequence, for example s[n], by means of a matched filter and/or a correlator, for example. At time instances where a correlation process may produce peaks in magnitude, the presence of the synchronization sequence may occur at the sampling instant in time where the matched filter (correlator) output magnitude may peak. The received input samples x[n] and the synchronization sequence s[n] may comprise a plurality of data symbols that may be over-sampled to generate sequences of NL samples. For example, the input signal may comprise N data symbols that may be oversampled by a factor L to generate NL samples.

In some instances, more accurate localization in time may be achieved by performing matched filtering (correlation) at a high over-sampling rate of the received signal. However, this may lead to undesirable computational complexity, as the matched filtering may have to be performed over NL multiplications, which may be complex. This may result in costly hardware, and the hardware cost may be growing, for example, exponentially with the over-sampling factor L. In the case of complex sequences, each of the complex multipliers may generate, for example, four multiplications and two additions.

The hardware cost may be reduced by down-sampling the received signal by a factor L, and matched filtering may be performed on N samples. This may, however, reduce the timing accuracy that may be achieved. In some instances where high timing accuracy may be required, for example better than within 1-in-N samples, 1-in-NL accuracy may be achieved if the matched filtering may be performed at the sampling rate. In accordance with various embodiments of the invention, the same 1-in-NL accuracy may be achieved with a reduced number of multipliers, as described below.

To reduce the number of multipliers that may be required to perform the correlation operation, while retaining timing accuracy, the number of samples to represent the synchronization sequence s[n] may be reduced from NL samples by creating a reference sample sequence a[k] that may comprise, for example, N coefficients. In accordance with various embodiments of the invention, the new synchronization sequence comprising the reference sample a[k] may be generated by the following relationship:

$$a[k] = \sum_{l=kL}^{(k+1)L-1} s[l] \qquad (1)$$

where L may be the over-sampling factor, l∈{0, ..., NL−1} and k∈{0, ..., N−1}. Hence, the reference samples a[k] may be generated from the original synchronization sequence s[n]. Similarly, the received input samples x[n] may be reduced by a Rioter L, from NL samples to N samples by the following relationship:

$$y_{N-k}[n] = \sum_{l=n-(k-1)L}^{n-(kL-1)} x[l]; \qquad (2)$$

$$k \leq N$$

where each $y_m[n]$ may be generated as the sum of L samples from x[n], where l=0, ..., NL. The generation of the samples $y_m[n]$ may be achieved as illustrated in FIG. 2, for example. The adder 208, for example, may generate $y_{N-1}[n]$, and similarly the adders 208a and 208b may generate $y_{N-2}[n]$ and $y_0[n]$.

The correlation output r[n] between the reference sample sequence a[k] and the generated sample sequence $y_m[n]$ may be achieved by the following relationship:

$$r(l, n) = \sum_{m=-\infty}^{\infty} a*[m] y_{m-l}[n] \qquad (3)$$

-continued $$r[n] = r(0, n) = \sum_{m=0}^{N} a*[m]y_m[n]$$

where r(l,n) may denote a correlation coefficient at a shift l and at sample n. In accordance with various embodiments of the invention, the above correlation may be performed at the over-sampling rate determined by n, that is, at the same rate of the over-sampled signal x[n]. Because the generated sequences a[k] and $y_m$[n] may comprise N samples instead of NL samples of the original sequences s[n] and x[n], there may be L times fewer multiplications performed for the correlation given in equation (3), compared to correlating s[n] and x[n] directly. As illustrated in FIG. 2, multipliers, of which multipliers 210, 210a and 210b may be illustrated. However, because the generated sample sequence $y_m$[n] may be updated at the over-sampling rate (as new samples x[n] may enter the correlator), and the correlation coefficient r[n] may be generated at the over-sampling rate also, the correlation accuracy may be similar to correlation with NL samples.

Figure 3:
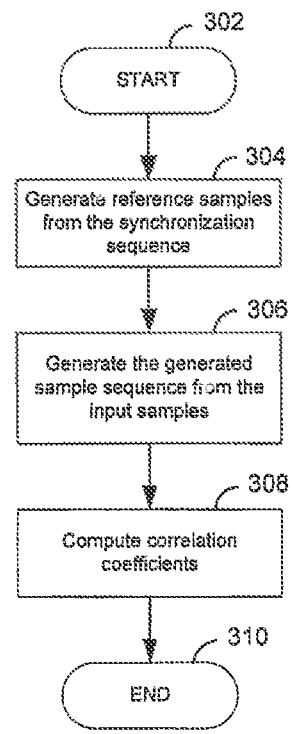
FIG. 3 is a flow chart illustrating an exemplary correlation process in accordance with an embodiment of the invention.

FIG. 3 is a flow chart illustrating an exemplary correlation process in accordance with an embodiment of the invention. After initializing the algorithm in step 302, reference samples a[k] may be generated from synchronization sequence s[n] in step 304. In step 306, the generated sequence $y_k$[m] may be generated from the input samples x[n], as described above for FIG. 2. In step 208, the reference samples a[k] may be correlated with the generated sequence $y_k$[m] according to equation (3) shown above.

In accordance with an embodiment of the invention, a method and system for efficient full resolution correlation may comprise correlating a first signal, for example $y_k$[n], with a second signal, for example a*[k], at a rate corresponding to a first discrete signal, for example x[n], wherein each sample of the first signal may be generated by summing a plurality of consecutive samples from the first discrete signal and the second signal may be generated by summing the plurality of consecutive samples from a second discrete signal, as described for FIG. 2. The correlating may be performed by a matched filter and/or a correlator, as described for FIG. 2 and FIG. 3. The first signal, for example $y_k$[n], comprising N samples may be generated by summing L consecutive samples for each of the N samples from the first discrete signal comprising N*L samples, for example x[n]. The second signal comprising N samples, for example a*[k], may be generated by summing L consecutive samples for each of the N samples from the second discrete signal comprising N*L samples, as described for FIG. 2. The first signal $y_k$[n] and the second signal a*[k] may be correlated by multiplying the N samples of the first signal with the N samples of the second signal in N multipliers and summing a plurality of outputs of the multipliers, as illustrated in FIG. 2. A maximum of the correlating may be determined to achieve synchronization between the first discrete signal and, the second discrete signal.

Another embodiment of the invention may provide a machine-readable storage, having stored thereon, a computer program having at least one code section executable by a machine, thereby causing the machine to perform the steps as described herein for efficient fall resolution correlation.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
generating, at a radio device, a reference sample sequence from a synchronization sequence;
generating, at the radio device, a generated sample sequence from an input sample sequence;
correlating, at the radio device, the reference sample sequence with the generated sample sequence by multiplying a first set of samples of the reference sample sequence with a second set of samples of the generated sample sequence to generate a plurality of outputs; and
summing the plurality of outputs to generate a correlation output signal.

2. The method of claim 1, wherein the generating the reference sample sequence comprises summing a plurality of consecutive samples from the synchronization sequence.

3. The method of claim 1, wherein the generating the generated sample sequence comprises summing a plurality of consecutive samples from the input sample sequence.

4. The method of claim 1, wherein the correlating comprises correlating by a matched filter.

5. The method of claim 1, wherein the reference sample sequence is generated by the following relationship:

$$a[k] = \sum_{l=kL}^{(k+1)L-1} s[l]$$

wherein,
a[k] is the reference sample sequence,
s[l] is the synchronization sequence, and
L is an over-sampling factor.

6. The method of claim 1, wherein the generated sample sequence is generated by the following relationship:

$$y_{N-k}[n] = \sum_{l=n-(k-1)L}^{n-(kL-1)} x[l];$$

$$k \le N$$

wherein,
$y_{N-k}[n]$ is the generated sample sequence,
x[1] is the input sample sequence, and
L is an over-sampling factor.

7. The method of claim 6, wherein each $y_{N-k}[n]$ is generated as the sum of L samples from x[1].

8. The method of claim 1, wherein the correlation output signal is generated by the following relationship:

$$r(l, n) = \sum_{m=-\infty}^{\infty} a*[m]y_{m-l}[n]$$

$$r[n] = r(0, n) = \sum_{m=0}^{N} a*[m]y_m[n]$$

wherein,
r(l,n) denotes a correlation coefficient at a shift l and a sample n,
r[n] is the correlation output signal,
a*[m] is the reference sample sequence,
$y_m[n]$ is the generated sample sequence, and
N is the number of samples.

9. The method of claim 8, wherein N is reduced from the number of samples in the synchronization sequence and the input sample sequence by an over-sampling factor.

10. The method of claim 1, wherein the correlating comprises correlating the reference sample sequence with the generated sample sequence at a rate corresponding to the reference sample sequence.

11. A radio device, comprising:
a processor, comprising logic, circuitry or code, configured to:
generate a reference sample sequence from a synchronization sequence;
generate a generated sample sequence from an input sample sequence; and
correlate the reference sample sequence with the generated sample sequence by multiplying a first set of samples of the reference sample sequence with a second set of samples of the generated sample sequence to generate a plurality of outputs and summing the plurality of outputs to generate a correlation output signal.

12. The radio device of claim 11, wherein the processor is configured to generate the reference sample sequence by summing a plurality of consecutive samples from the synchronization sequence.

13. The radio device of claim 11, wherein the processor is configured to generate the generated sample sequence by summing a plurality of consecutive samples from the input sample sequence.

14. The radio device of claim 11, wherein the processor is configured to correlate the reference sample sequence with the generated sample sequence using a matched filter.

15. The radio device of claim 11, wherein the processor is configured to generate the reference sample sequence using the following relationship:

$$a[k] = \sum_{l=kL}^{(k+1)L-1} s[l]$$

wherein,
a[k] is the reference sample sequence,
s[l] is the synchronization sequence, and
L is an over-sampling factor.

16. The radio device of claim 11, wherein the processor is configured to generate the generated sample sequence using the following relationship:

$$y_{N-k}[n] = \sum_{l=n-(k-1)L}^{n-(kL-1)} x[l];$$

$$k \le N$$

wherein,
$y_{N-k}[n]$ is the generated sample sequence,
x[1] is the input sample sequence, and
L is an over-sampling factor.

17. The radio device of claim 16, wherein the processor is configure to generate each $y_{N-k}[n]$ as the sum of L samples from x[1].

18. The radio device of claim 11, wherein the processor is configured to generate the correlation output signal using by the following relationship:

$$r(l, n) = \sum_{m=-\infty}^{\infty} a*[m]y_{m-l}[n]$$

$$r[n] = r(0, n) = \sum_{m=0}^{N} a*[m]y_m[n]$$

wherein,
r(l,n) denotes a correlation coefficient at a shift l and a sample n,
r[n] is the correlation output signal,
a*[m] is the reference sample sequence,
$y_m[n]$ is the generated sample sequence, and
N is the number of samples.

19. The radio device of claim 18, wherein N is reduced from the number of samples in the synchronization sequence and the input sample sequence by an over-sampling factor.

20. The radio device of claim 11, wherein the processor is configured to correlate the reference sample sequence with the generated sample sequence at a rate corresponding to the reference sample sequence.

* * * * *